United States Patent [19]

Niessen

[11] Patent Number: 4,938,875
[45] Date of Patent: Jul. 3, 1990

[54] METHOD AND APPARATUS FOR MAGNETICALLY TREATING A LIQUID

[76] Inventor: Philippe Niessen, Paseo Garbi 129-131D, E - 08860 Castelldefels, Spain

[21] Appl. No.: 269,662

[22] PCT Filed: Dec. 21, 1987

[86] PCT No.: PCT/BE87/00020
§ 371 Date: Sep. 26, 1988
§ 102(e) Date: Sep. 26, 1988

[87] PCT Pub. No.: WO88/05763
PCT Pub. Date: Aug. 11, 1988

[30] Foreign Application Priority Data

Jan. 28, 1987 [BE] Belgium ............................ 08700056

[51] Int. Cl.$^5$ ............................................ B01D 35/06
[52] U.S. Cl. ................................... 210/695; 210/222; 210/223
[58] Field of Search ............... 210/222, 695, 223, 243, 210/748; 435/2, 173; 204/147, 149, 152, 155, 180.1, 180.2, 186, DIG. 5; 426/237, 247

[56] References Cited

U.S. PATENT DOCUMENTS

| 2,652,925 | 9/1953 | Vermeiren | 210/222 |
| 3,703,958 | 11/1972 | Kolm | 210/695 |
| 4,299,701 | 11/1981 | Garrett et al. | 210/222 |
| 4,326,954 | 4/1982 | Shroyer | 210/222 |
| 4,879,045 | 11/1989 | Eggerichs | 210/223 |

FOREIGN PATENT DOCUMENTS

| 487441 | 2/1949 | Belgium . | |
| 1277488 | 9/1968 | Fed. Rep. of Germany . | |
| 1467785 | 12/1968 | Fed. Rep. of Germany . | |
| 2144418 | 4/1971 | Fed. Rep. of Germany | 426/247 |
| 2702756 | 7/1978 | Fed. Rep. of Germany | 426/237 |
| 2731148 | 1/1979 | Fed. Rep. of Germany . | |
| 3343586 | 5/1985 | Fed. Rep. of Germany . | |
| 3443810 | 4/1986 | Fed. Rep. of Germany . | |

Primary Examiner—W. Gary Jones
Assistant Examiner—Matthew O. Savage
Attorney, Agent, or Firm—Herbert Dubno

[57] ABSTRACT

A method and apparatus for magnetically treating liquids and biological tissues is disclosed. The method and apparatus include the steps of enclosing a space receiving a liquid or biological tissue to be treated with at least one wall, providing on the wall a secondary coil at least partially surrounding the space, connecting the secondary coil in an oscillating circuit having an adjustable resonance frequency and polarizable resonant signal, juxtaposing the secondary coil with a primary coil insulated from and inductively coupled with the secondary coil, and connecting the primary coil across an electronic generator supplying electrical pulses of selected shape, frequency, and amplitude to the primary coil whereby the pulses induce electrical signals in the secondary coil.

6 Claims, 1 Drawing Sheet

METHOD AND APPARATUS FOR MAGNETICALLY TREATING A LIQUID

CROSS REFERENCE TO RELATED APPLICATIONS

This application is a national phase application of PCT/BE87/00020 filed December 21, 1987 and based, in turn, upon a Belgium National Application No. 8700056 filed January 28, 1989 under the International Convention.

FIELD OF THE INVENTION

The present invention relates to a process for the capacitive transfer of electromagnetic energy to biological liquids or tissues by induction through a wall of metallic or other material, to modify certain ionic charges of the suspended or dissolved particles, so as to alter their physical or physio-chemical behavior, without any contact with the treated substance or without any chemical modification of the latter.

The invention also relates to a process capable of modifying the surface polarity of the inner wall of a tube or container containing the liquid, or of parts, whether or not made of metal, immersed in the liquid to prevent, slow down, stimulate or control the uniform and even coating by incrusting salts.

The invention relates as well to a process for protecting metals from corrosion by means of an adhering layer of calcareous fur, for example, said process permitting a continuous check of the entirety of the liquid present, whereas, previously, the operator was content with passing the liquid into a processing chamber, necessarily of measured size and restricted rate of flow, with, sometimes, losses of pressure and always a loss of efficiency as the distance from said chamber increases in space and time.

BACKGROUND OF THE INVENTION

To soften water or dimineralize it, the prior art used either distillation, or chemical means such as ion exchanger appliances, or the addition of polyphosphates, etc. The drawbacks are known of such processes which alter water chemically and sometimes make it unsuitable for consumption, i.e. nondrinkable.

On the other hand, the amount of sodium present in water after treatment with an ion exchanger makes it inadequate for people following a salt-free diet. Moreover, the periodic regeneration of the system brings about a pollution of the environment which is not negligible and is expensive for the user and the community.

Among the appliances used at present to prevent scaling the following apparatus may be noted:

Apparatus using permanent magnets, the treatment consisting in passing the liquids through the fields of one or more magnets. The operation of such apparatus is dependent upon the condition of the magnets which are fragile and may lose their qualities by becoming coated, particularly with iron particles, and the installation of these appliances requires the opening of the pipes.

So-called electric or electronic apparatus made up a processing chamber containing an anode and a cathode and through which the water to be processed passes. These appliances can process only a limited amount of water, restricted by the capacity of the processing chamber. The deterioration of the anode or the cathode brings about a decrease of output and supervision is therefore necessary. The ducts definitely have to be opened for setting up the apparatus.

So-called ultrasonic appliances, composed of an ultrasonic generator and of an emission probe incorporated into the water duct or the boiler, and the vibrations of which are thought to prevent or destroy existing scaling.

Electronic apparatus of a so-called induction type consisting of a generator and cables coiled on both sides, around the pipe. The capacity of such apparatus is very limited as they create only a very weak current which cannot be verified in situ and are absolutely not suitable for the constant rates of flow or for the large diameters of the pipes. Accordingly, their industrial applications are either impossible or very restricted.

The process of capacitive transfer by induction of the invention uses at least two separate electric circuits, one primary circuit connected to an electronic generator supplying the electric pulses which can be set, or are already set, in terms of shape, frequency, amplitude and intensity, and one secondary circuit constituting an oscillating circuit, the resonance frequency of which is regulable and polarizable, and covering, wholly or partly, the outside of the walls of a pipe, a tank or a barrel.

According to the invention several primary circuits can be connected to the same settable or preset generator, permitting coupling to several secondary circuits, whose resonance frequency is regulable, amplifiable or polarizable separately by a circuit by means of fixed or variable capacitors, or other electric or electronic assembly, such as quartz, transistors or diode.

BRIEF DESCRIPTION OF THE DRAWING

Other characteristics of the invention will become clear from the following description based on the attached drawing, wherein.

SPECIFIC DESCRIPTION

Figure 1:
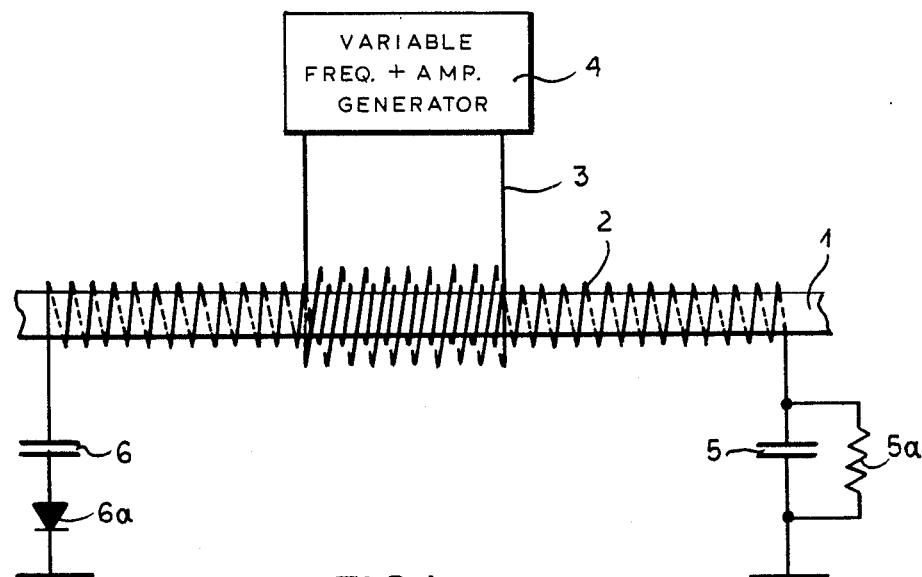
FIG. 1 is a diagrammatic view of an apparatus according to the process, when the support of the secondary circuit is in a conductive material.

Shown in FIG. 1 is a pipe 1 of conductive material, through which the induction is to be effected. Around the pipe 1 there is wound with contiguous turns not overlapping, a flexible, insulated electrically conductive cable 2; this winding 2 is termed a secondary circuit.

Wound on the winding 2, in the same direction and with contiguous turns, is another flexible, insulated, electrically-conductive cable 3. This winding 3 is termed a primary circuit, its ends are connected to a generator 4 which is an electric pulse generator, said pulses being polarized or non-polarized, settable or preset as regards frequencies, shapes, amplitudes and intensities, with two outputs (or more depending on the number of primary circuits 3) constituted by terminals or other system of sockets or plugs permitting satisfactory electric contact.

Connected to one end of the electric cable constituting the secondary circuit 2 is the plate of a fixed or variable capacitor 5, the other plate being connected to ground. This capacitor can tune the oscillating circuit and may be either of fixed value, or of variable value. A fixed or variable resistor 5a may be connected thereto in parallel to complete the tuning system, this being stated indicatively but non-limitatively.

To the other end of the electric cable 2 another fixed or variable capacitor 6 is connected by one of its plates. This capacitor 6 is optional, the capacitor 5 being frequently adequate for tuning the circuit. Should this capacitor 6 not be provided, said end of cable 2 is left free and insulated, or also, depending on cases, grounded directly or with the interposition of a diode 6a intended for polarization.

Figure 2:
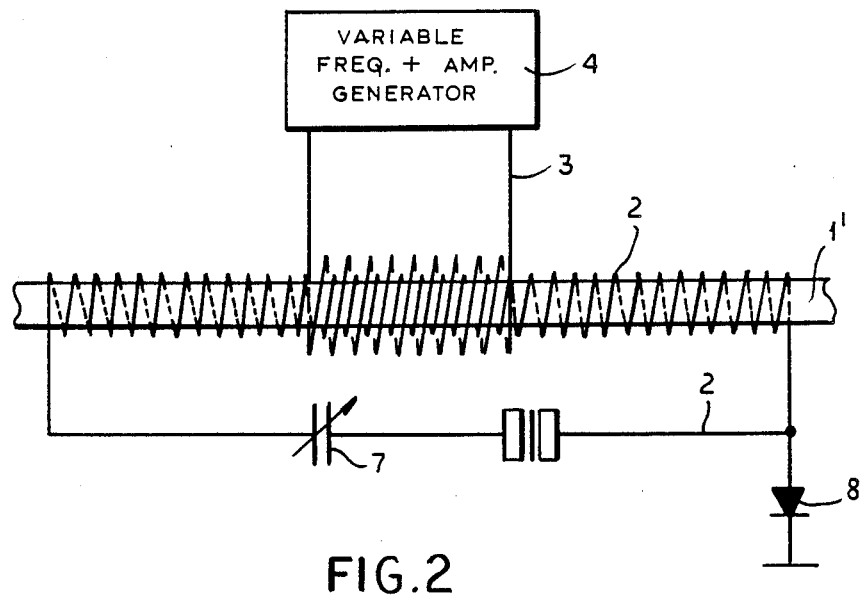
FIG. 2 is a view similar to that of FIG. 1 in an alternative embodiment, when the support of the secondary circuit is in a non-conductive material.

It will be seen from FIG. 2 that when support 1' of the secondary circuit 2 is a non-conductive material, for example PVC tubing, or is a plastic tank, according to the invention the ends of the secondary winding 2 are connected together. The inter-position in this system of a capacitor 7 is possible, the capacitor being of fixed or variable value, coupled or not coupled to a fixed or variable resistor; furthermore, said capacitor may be replaced by said resistor or by any other tuning system, such as, e.g. a quartz tuning element.

Depending on the deserved result there is further provided (at 8) an optional ground connection, either directly or with the interposition here also of a diode intended for polarization.

The process of the invention allows various applications which are described hereinunder, this description, of course, not being limitative.

To protect a metal part from corrosion by hard or limestone-producing water, the part, of metal, or non-conductive but coated with a conductive coating, is immersed in the processed water and connected to a source of direct current with a negative potential with respect to the walls of the tank.

This process permits, for example, the pre-treatment of metal reinforcements intended to be embedded in concrete but exposed meanwhile to the weather and which may not, or may only slightly, oxidize. In this example the bonding of the concrete and of the treated reinforcements is improved without recourse to costly chemical products which, sometimes, pollute the environment.

The application of the process described permits verifying the size and shape of some crystals, for example calcium carbonate which is dimorphous, and thus make them able to be retained by a suitable filter. It follows that the water is softened, by physical means, exclusively.

An application of the process of the invention permits producing apparatus intended to fight calcareous or other scale, for example of magnesium, not only in pipes or tanks, but also in heating and cooling apparatus. To do so, use is made of a maximum of pipes coated with the secondary winding 2, in open or closed circuit. Those tanks which may be necessary may also carry on their walls this secondary circuit 2, printed, incorporated or otherwise applied thereon.

The aim of the secondary circuit 2 is to line a maximum of surface to treat the entirety of the liquid. It is the primary circuit 3, connected to the generator 4 which will induce the selected electric signal, regulable or preset, in the secondary circuit 2, which may be tuned and/or polarized. The electric and electromagnetic field resulting therefrom has the peculiarity of modifying the incrustation kinetics by acting on the electrochemical potential of the surfaces and therefore of the adherence of the calcium carbonate deposits, but also influences the suspended and dissolved solid particles by the modification of ionic charges, a modification brought about by the induced electric and electromagnetic field.

A measurement of the modification of the conductivity of the water may be made, by comparison—before and after treatment—by means of a conductimeter.

It will therefore be seen that this application of the process described not only makes it possible to prevent calcium carbonate from adhering on the walls, but also permits obtaining a non-scaling water through the modification of the ionic charges influencing the nucleation and precipitation of crystals. Neither the drinking quality nor the chemical composition of the water will be changed.

An application of the process according to the invention may be intended for the improvement of the qualities of mineral waters and other beverages prepared with them.

It is known that bottled mineral water before it reaches the table loses some qualities which the water may posses when drunk at the spring.

Apparatus made for the application of the process described has two advantages:

(1) Water is non-scaling, and this has been found to be beneficial for health; and (2) Electromagnetic stimulation of water has biologically beneficial effects for the consumer who will thus find a water of a quality closer to that which it had at the spring.

Hitherto, only apparatus with permanent magnets forcing the water to pass through their fields, had been used.

These appliances are designed for incorporation into the piping, of for fixing to the running water tap, or also to the end of a type of funnel into which the contents of the bottle of mineral water would be poured.

Using apparatus according to the process makes it possible to retain in the water the mineral salts needed for health, but without their drawbacks, such as, for example, their injurious contribution to the formation of gallstones (according to some medical works). Apparatus designed for an application of the process might be a bottle holder, a kind of inducing sleeve with handle, containing the primary and/or secondary circuits, and a miniaturized generator with its own supply, incorporated or otherwise.

Biological applications of the process of the invention include the preparation and preservation of fermenting beverages, particularly to speed up the preparation and aging process. To mention an example, the barrels intended for wine storage in cellars may also easily be fitted with a winding constituting a secondary circuit according to the invention, the primary circuit remaining movable and the generator being easily positioned in the barrel supporting cradle or in the immediate vicinity. The induction of electromagnetic fields and electric fields seems to be very promising in this field, as the induced effect is purely physical or physio-chemical, without drawbacks for the wine, the harmoniuos aging of which it promotes.

As an example of apparatus constructed for the application of the process of the invention a description is given herinbelow of an apparatus for treating water in order to obtain a colloidal precipitation preventing the formation of a furring deposit.

The generator 4 is a low frequency electric pulse generator, e.g. 4000 Hz, with square signals of an amplitude of 50 V. For this simple example, the power may be 5 W.

The generator 4 will be supplied by the electric mains or in any other way, and will have two terminals for connection to the primary circuit.

The parameters given above are for guidance and, anyway they are adjustable (frequency and amplitude, for example).

The secondary circuit 2, on a support 1 with a diameter of 19 mm, for example, will use about twenty meters of flexible cable (conductor section 1 sq. mm), insulated, which is carefully wound with contiguous turns, without overlap, around the pipe 1 (galvanized, in this example). The length of the cable may be substantially reduced or increased.

Each end of this winding 2 will be connected to a grounded capacitor 5, 6.

The circuit 2 may be polarized by adding a diode 6a to it (FIG. 1).

The primary circuit 3 will be made up of an electric cable which may have the same characteristics as that of the secondary circuit 2, but much shorter (about 1/5th of the secondary circuit. The primary winding is applied on the secondary winding, with contiguous turns, compulsorily in the same direction. The two ends will be electrically connected to the terminals of the generator 4.

The casing containing the generator 4 should be fixed close to the pipe 1 to prevent needless lengths of cable.

The shape of the secondary circuit 2 is infinitely variable.

When tank walls are involved, a surface printed circuit may be made, or also embedded into the surface material when it is of insulating type. This circuit may, at the same time, act as reinforcement for the tank or ducts if it is made, for example, of steel wire, rods or plates.

The mechanical and electrical separation of the secondary circuit 2 and primary circuit 3 greatly facilitates the designing and handling of various containers equipped according to this process.

The primary circuit 3 can also be designed to have the exact shape of the secondary circuit 2 so as to obtain adequate induction (coupling).

It will be possible to make a check of the secondary circuit 2 by means of, for example, an oscilloscope, or a small receiver matched to the frequency to make it audible.

Among the measurements which may be taken to check the satisfactory operation of the system the following will be noted, among others;

(1) A visual check of the shape of the crystals (electron microscope);

(2) Measurement of the cloudiness of the water;

(3) Measurement of water conductivity with a conductimeter;

(4) Hardness and adherence of the deposits and/or scaling.

The electrically insulted secondary circuit or circuits can be incorporated into the walls of the pipe, tank or container to constitute a metal reinforcement thereof.

When the process is applied to the obtaining of a water softened by reducing the total hardness (TH) the system can include one or more filters arranged in parallel or in series in the pipe, capable of retaining by filtration a large number of crystals of calcium carbonate and other products whose formation was influenced by the field formed by the secondary current as the liquid passed through the pipe.

The system is applicable to the coating of one or more even layers of calcium carbonate and other products on any metal part or nonmetallic part made electrically conductive by the application on its surface of a special coating. In this case, the part is immersed in or connected with a treated water and the part is connected to a supply of direct current and has a negative potential with respect to the surrounding medium (tanks walls, tap, etc.).

When the processes of the invention is intended to combat incrustations such as scale or "fur" in pipes, boilers, tanks, cooling systems and domestic or industrial water supply equipment, the secondary circuit is tuned and the polarization of its signals selected for destabilization of existing scale and the generator is controlled depending on the salt content and the rate of water flow to protect against scaling.

The invention is also applicable to improve the biological properties of the contents of bottles in that the primary circuit and generator are incorporated in a support for one or more bottles and the bottles are surrounded with one or more secondary circuits in a sleeve with or without handles. The process may be applied to speeding up the preparation and aging of fermented beverages by embedding the secondary circuit in a container for the beverages.

The process may be used for agricultural applications such as protection against diseases or for stimulation of the growth of plants. In that case, the primary circuit can be formed as a kind of grating and each secondary circuit (one for each plant) can be incorporated in an insulating rod supporting loops of insulated, rigid but maleable conductor wire, the grating being connected to the generator and the loops of a secondary circuit being disposed around and a few centimeters away from the plant.

I claim:

1. A method of treating a liquid, comprising the steps of:
    enclosing a space receiving a liquid to be treated with at least one wall;
    providing on said wall a secondary coil at least partly surrounding said space;
    connecting said secondary coil in an oscillating circuit having an adjustable resonance frequency and a polarizable resonant signal;
    juxtaposing said secondary coil with a primary coil insulated from and inductively coupled with said secondary coil; and
    connecting said primary coil across an electronic generator supplying electrical pulses of selected shape, frequency and amplitude to said primary coil and forming a primary circuit with said primary coil, whereby said pulses induce electrical signals in said secondary coil.

2. The method defined in claim 1 wherein said space is a duct traversed by said liquid and surrounded by said secondary coil.

3. The method defined in claim 1 wherein said liquid is water and scaling of said wall by said water is prevented by adjusting said resonant frequency and polarization and controlling said generator to destabilize existing scale and protect against scaling of said wall.

4. An apparatus for treating a liquid, comprising:
    a pipe;
    a scondary coil wound on said pipe;
    at least one capacitor connected to said secondary coil and forming an oscillating circuit having an adjustable resonance frequency and a polarizable resonant signal with said secondary coil;

a primary coil wound on said secondary coil; and an electrical generator supplying electrical pulses of selected shape, frequency and amplitude and forming a primary circuit with said primary coil whereby said pulses induce said signals in said secondary coil and a resonant signal in said secondary coil produces a field affecting a liquid traversing said pipe.

5. The apparatus defined in claim 4 wherein said secondary coil has one end connected through a first capacitor to ground and bridged by a resistor and another end connected through a second capacitor and a diode to ground.

6. The apparatus as defined in claim 4 wherein an adjustable capacitor connects ends of said secondary coil together and one of said ends is connected through a diode to ground.

* * * * *